UNITED STATES PATENT OFFICE.

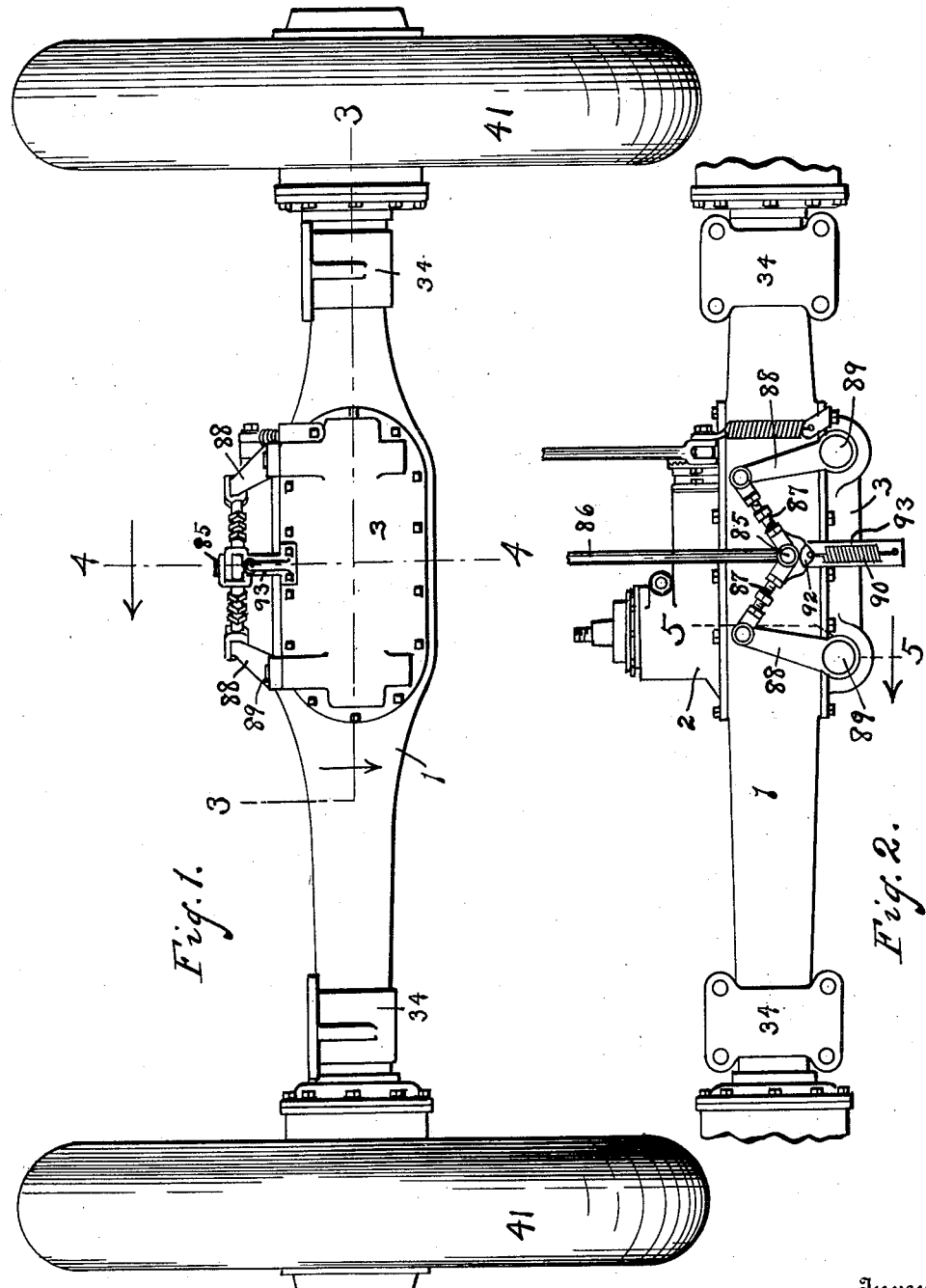

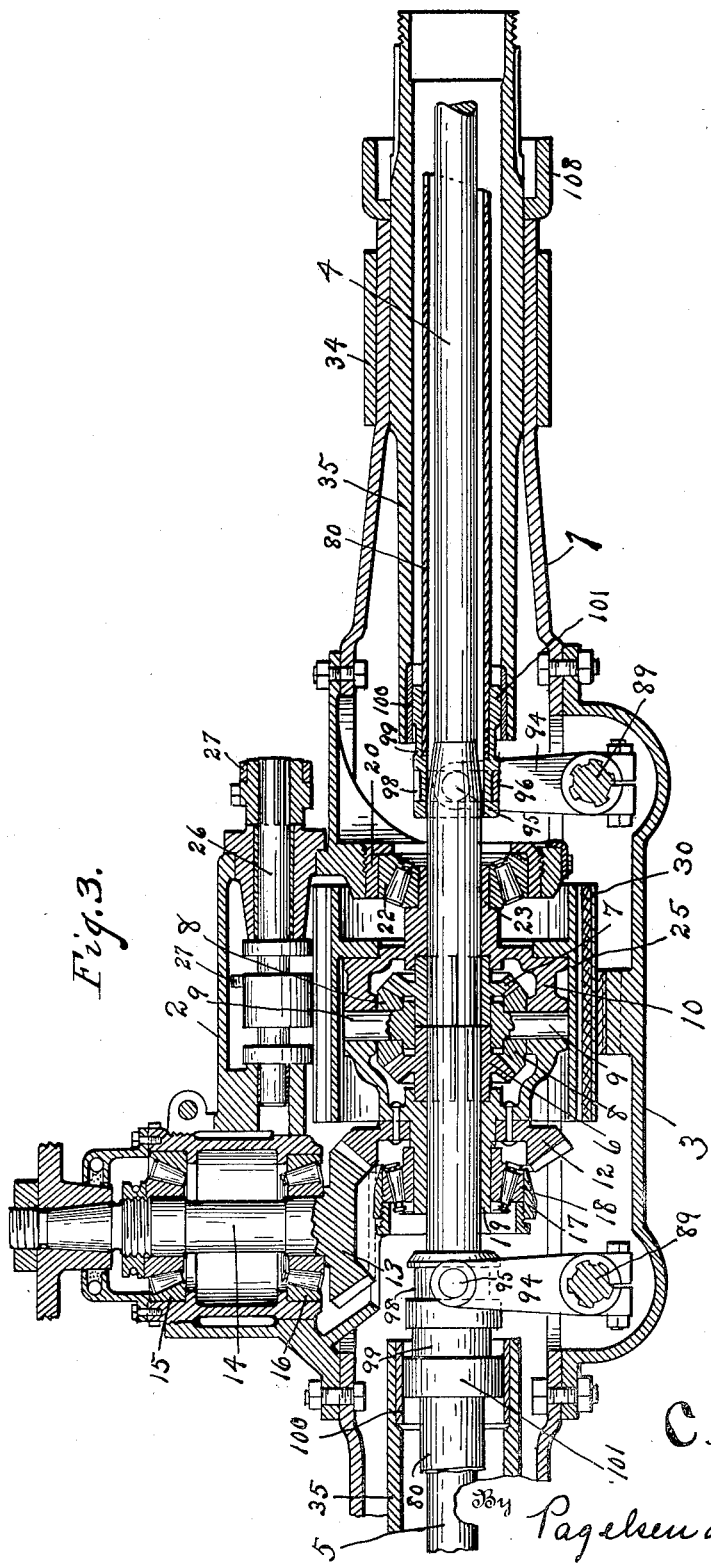

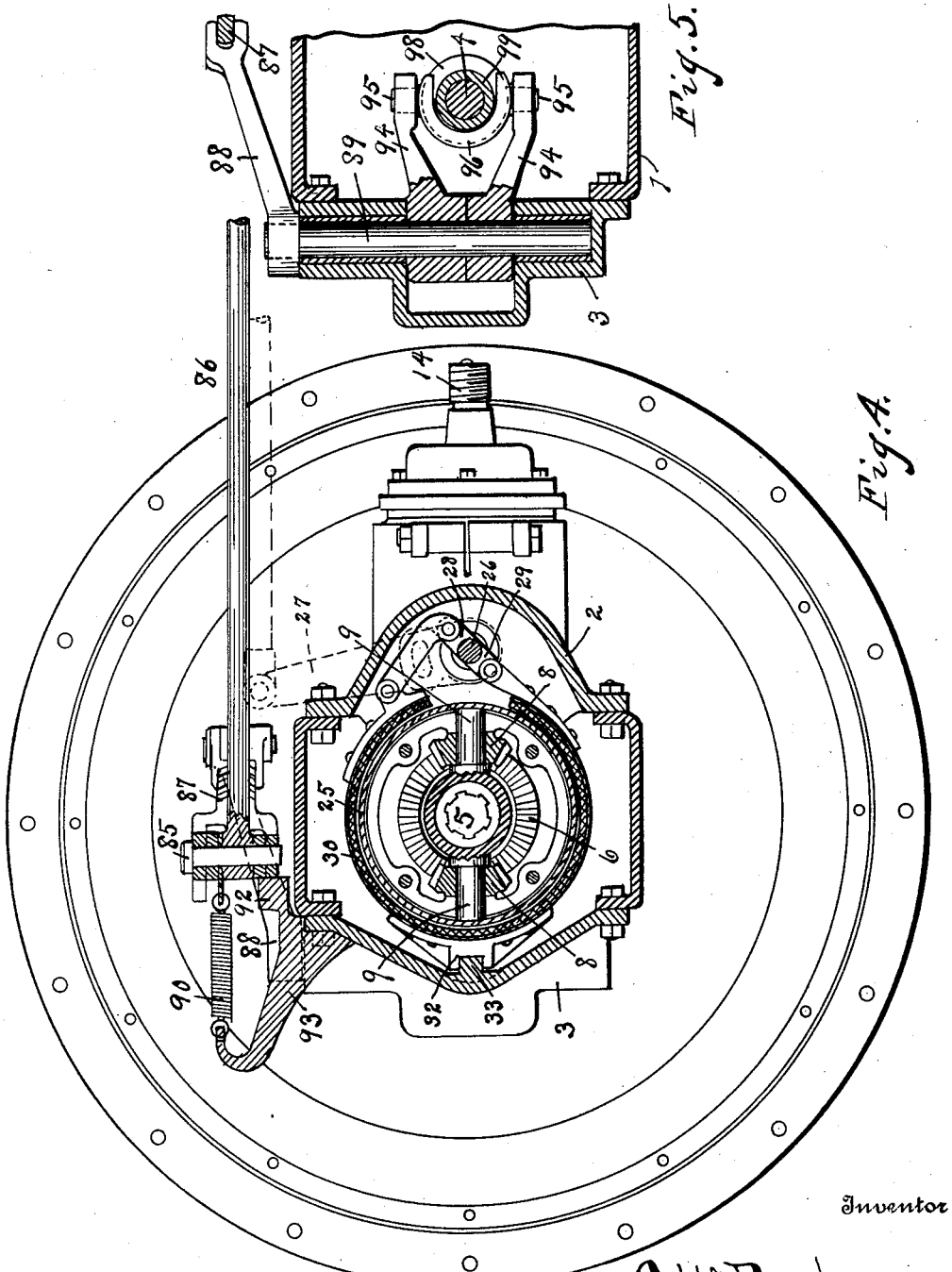

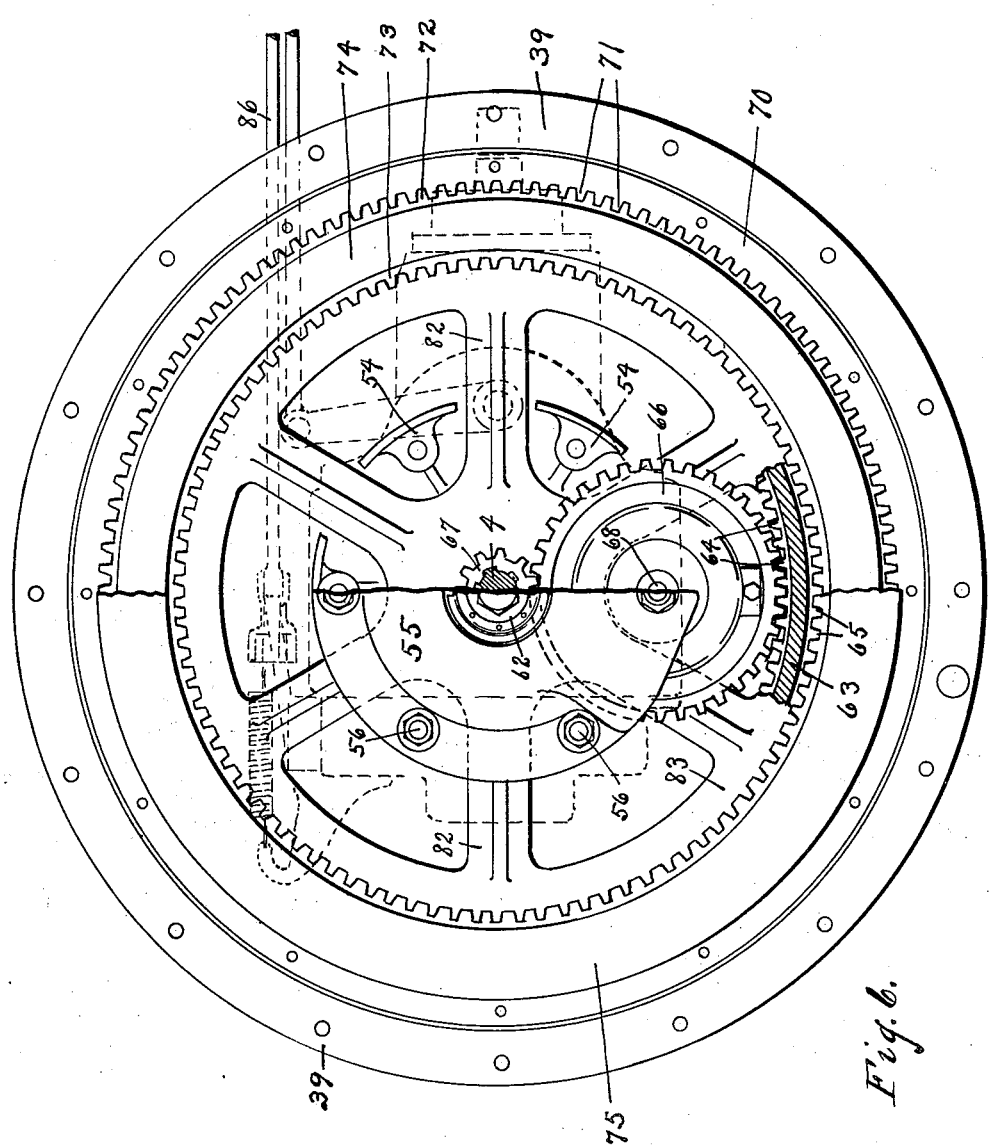

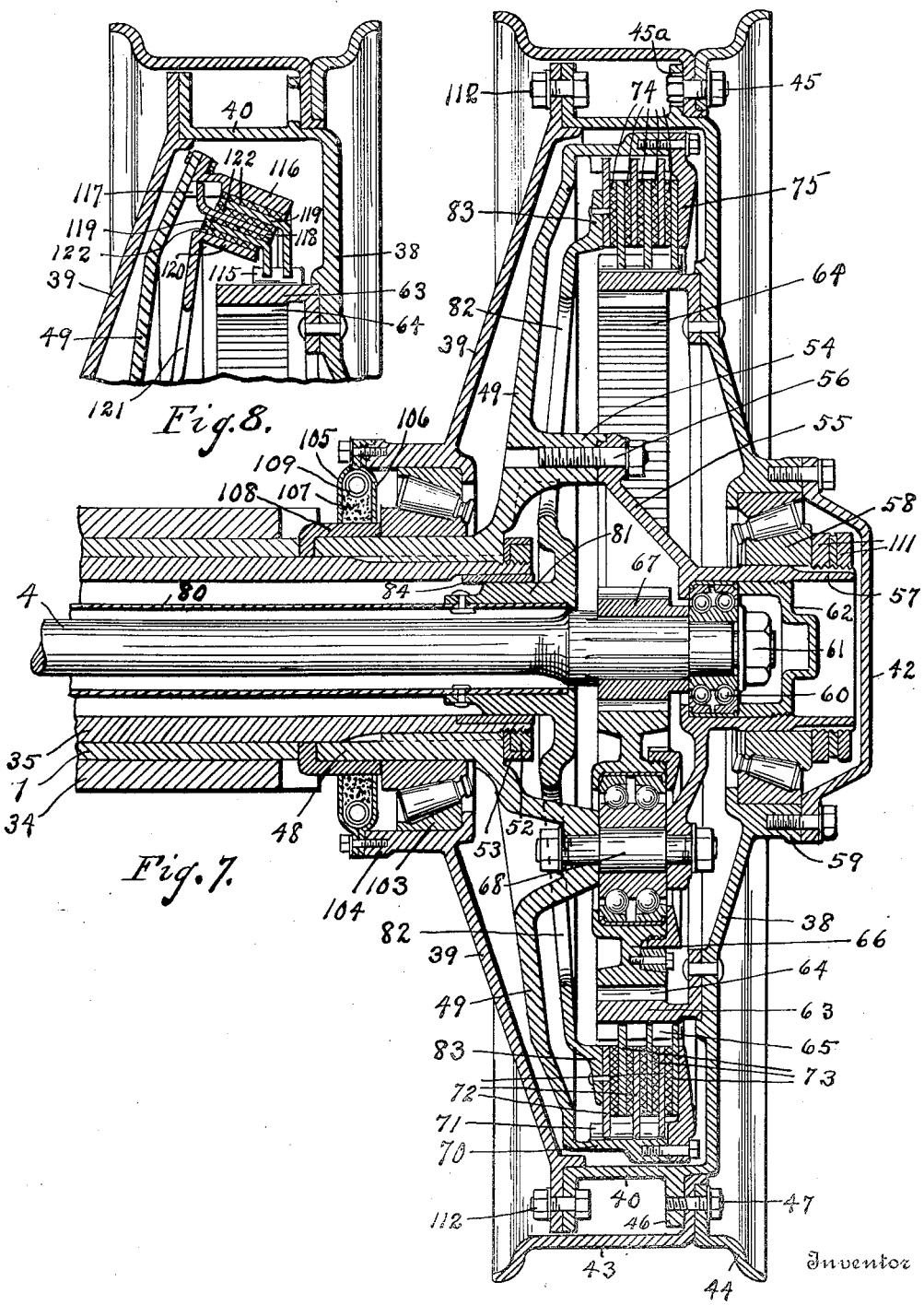

CLARK W. PARKER, OF NEW YORK, N. Y.

TRACTOR-WHEEL.

1,316,057.  Specification of Letters Patent.  Patented Sept. 16, 1919.

Application filed October 4, 1918. Serial No. 256,790.

*To all whom it may concern:*

Be it known that I, CLARK W. PARKER, a citizen of the United States, and residing at New York, in the county of New York and State of New York, have invented a new and Improved Tractor-Wheel, of which the following is a specification.

This invention relates to the axles and tractor wheels for motor vehicles, particularly trucks, and its object is to provide a simple, powerful driving gearing and a tractor wheel within which the gearing is mounted, and also to provide a brake mechanism mounted within the wheel and so constructed as to have a braking surface of maximum diameter. Another object of this invention is to provide an axle and tractor wheels which will permit of maximum road clearance of the differential gear casing. A further object of this invention is to provide a hollow tractor wheel in which reduction gearing and brake mechanism may be entirely submerged in oil.

This invention consists in a tractor wheel formed of two sides joined at their peripheries, an axle extending into the wheel, and gears within the wheel by means of which it may be driven from the axle.

It further consists of an axle casing, a supporting member secured on the end of said casing and extending into said tractor wheel, and bearings carried by this supporting member upon which the tractor wheel is mounted.

It also consists in mounting a bearing for the end of the axle in the supporting member.

It also consists in mounting a brake mechanism on the supporting member within the tractor wheel and providing means extending from adjacent the axle to said brake mechanism for operating the same.

It also consists in securing a ring of gear teeth to the inner side of one of the sides of said wheel and forming a ring of teeth on said supporting member and in providing a brake mechanism in the form of flat rings of metal with rings of fibrous material between them, the metal brake rings engaging the two rings of teeth alternately.

It also consists in providing a hub on the inner side of said wheel and a fibrous spring-held seal for the space between the hub and the axle casing.

It also consists in the details of construction illustrated in the accompanying drawings and particularly pointed out in the claims.

In the drawings, Figure 1 is a rear elevation and Fig. 2 is a plan of an axle for a motor vehicle. Figs. 3 and 4 are sections on the lines 3—3 and 4—4 of Fig. 1 on a larger scale. Fig. 5 is a section on the line 5—5 of Fig. 2. Fig. 6 is an elevation of the internal mechanism of a tractor wheel, parts being broken away for clearness. Fig. 7 is a central longitudinal section of this tractor wheel. Fig. 8 is a similar section of a modified form of a brake mechanism.

Similar reference characters refer to like parts throughout the several views.

Referring first to Figs. 1 to 5 inclusive, the rear axle casing 1 may be of any desired construction but is preferably formed with the front cap 2 and the rear cap 3. Midway between its ends this casing and its caps inclose and support the differential mechanism which is as follows.

*The differential.*—The two half axles (Fig. 3) 4 and 5 have bevel gears 6 and 7 on their adjacent ends which gears mesh with the bevel gears 8 on the pins 9 carried by the differential cage 10. A bevel gear 12 is secured to this cage 10 and meshes with the pinion 13 on the shaft 14 which may be driven in any desired manner. The cap 2 supports roller bearings 15 and 16 for this shaft 14 and a sleeve connected to this cap supports a roller bearing 18 for a hub 19 on the cage 10 of the differential. This cap also supports a ring 20 which carries a roller bearing 22 for the second hub 23 of this cage 10.

A brake cylinder 25 is secured to the differential cage and a shaft 26 is journaled in the cap 2. An arm 27 is adjustably secured to the outer end of this shaft and a pair of arms 28 and 29 (Fig. 4) are connected to the shaft intermediate its ends. These arms connect to a brake band 30 and a centering plate 32 on the band is positioned by a lug 33 on the inner side of the cap 3. This provides a strong emergency brake. The service brake will be described later on.

The springs of the vehicle will be mounted on the saddles 34. Extending into each end of the outer axle casing 1 is a tube 35 which is rigidly connected to this outer portion 1 and is virtually a part of the axle casing, and will be considered as such in the claims.

*The tractor wheel.*—The tractor wheel is formed of the two sides 38 and 39 connected at their peripheries by a cylindrical portion 40, preferably integral with one of the sides. The outer side is preferably formed with a central opening which is closed with a cap 42. The outside periphery of the wheel may be of any desired form to receive any selected tire 41 or rim, Fig. 7 showing a rim formed of two parts 43 and 44 connected by bolts 45 and secured to a flange 46 on the wheel by means of bolts 47. This flange may have holes 45ª for the heads of the bolts 45. The parts of the wheel are secured together oil-tight.

Splined onto the outer end of the casting-tube 35 is a hub 48 of a web 49 of a gear and brake supporting member. This hub is held in position by means of a nut 52, which in turn, is kept from turning by a lock plate 53. A series of lugs or posts 54 on this web 49 support a cup-shaped cap 55 which is secured in place by means of the studs 56, the connection being so rigid that this cap constitutes a continuation of the supporting member. On the outer cylindrical extension 57 of this supporting member is mounted a roller-bearing 58 for the outer hub 59 of the traction wheel, and within this extension is a bearing 60 for the outer end of the axle 4. A nut 61 and plug 62 may be used to hold this bearing in position.

A gear ring 63 having internal teeth 64 and external teeth 65 is secured to the outer side of the wheel and the internal teeth thereof mesh with the idler gear 66 which meshes with the spur pinion 67 on the axle. A short shaft 68 for the idler may be secured to both the web 49 and the cap 55 of the bearing supporting member. Any desired type of bearing may be used for this idler gear.

*The service brake.*—Extending outwardly from the periphery of the web 49 is a cylindrical flange 70 having internal teeth 71. A series of toothed metal rings 72 mesh with these internal teeth and other toothed rings 73 mesh with the external teeth 65 on the gear ring 63. Between the two sets of rings 72 and 73 are friction rings or washers 74 of fiber, preferably woven asbestos properly reinforced. A radial flange or ring 75 secured to the flange 70 limits the lateral movement of these rings.

A brake operating member 80, preferably in the form of a tube, extends around the axle 4 and on its outer end is mounted a spider having a hub 81, arms 82 and a rim 83 which is preferably connected to the innermost toothed ring 72. The hub 81 is slidable in the outer end of the axle casing tube 35, a bushing 84 being provided if desired. This tube 80 does not turn but is longitudinally slidable by the mechanism shown in Figs. 1 to 5 inclusive.

A brake rod 86 extends forward from the axle casing where it connects to a pin 85 mounted in the ends of the adjustable links 87 which pivotally connect to the ends of the crank arms 88 secured to the short vertical shafts 89. A spring 90 normally holds the rear end of the rod 86 against the shoulder 92 on a bracket 93 secured to the cap 3. Each shaft 89 is journaled in the cap 3 and carries the crank arms 94 which have holes in their outer ends to receive the pins 95 on the claw 96 that fits into the groove 98 in the sleeve 99 secured to the tube 80. The tube 35 is preferably provided with a bushing 100 to guide the enlargement 101 on this sleeve. This bushing must be large enough to permit the sleeve 99 to slide through it.

When the brake-rod 86 is moved forward, the crank arms 88 will be swung outwardly causing the tubes 80 to move outwardly and also causing the spiders on the ends of these tubes to press the brake rings 72, 73 and 74 against each other and against the stationary flange 75 on the supporting member. Because of the great brake areas of all these rings a slight pressure of the brake spider will cause great friction between these rings, and as the rings 72 are stationary, the retarding action on the tractor wheel will be great.

Mounted on the hub 48 of the bearing support is a bearing 103 for the inner hub 104 of the tractor wheel, and adjacent this bearing and attached to this hub are two plates 105 and 106 which embrace a ring 107 of felt or other fibrous material which is held against the collar 108 by means of a coiled spring 109 bent to constitute a ring. This felt ring will prevent oil from splashing out between the rollers of the bearing 103.

It will be seen that the hub 48 of the bearing carrier is substantially a continuation of the axle casing and if it were not for the difficulties of assembling the structure, this supporting member could be made integral with the casing. The tube 80 which operates the brake may be replaced by any other longitudinally movable member of sufficient stiffness that can extend through within the axle casing and through within the bearing 103 thereon.

To disassemble the wheel, the cap 42 is removed and the nuts 111 which hold the bearing 58 in place are screwed off the cylindrical extension 57. The bolts 112 are then removed which permits the outer side 38 of the wheel together with the gear ring 63 to be lifted off. The plug 62, the nut 61 on the end of the axle and the nuts on the studs 56 and shaft 68 are then unscrewed which permits the cap 55 and the gears 66 and 67 to be taken out. When the flange 75 is released the brake rings can be removed. The cap 3 of the casing is taken off and with it the arms 94 and claws 96 which releases the inner end of the tube 80 and permits the brake spider and tube 80 to be removed so as to give access to the nut 52. When this is released, the web 49 and the hub 48 and the side 39 of the wheel can be slipped off the end of the casing.

In Fig. 8 a modified type of brake mechanism is shown. The sides 38 and 39 and cylindrical portion 40 of the wheel are the same as before. The gear ring 63 has the same internal teeth 64 but the external teeth 115 are shorter. The web 49 of the bearing supporting member has secured to it a conical flange 116 provided with short teeth 117 which prevent the conical metal ring 118 from turning. Other conical rings 119 have radial toothed extensions which engage with the teeth 115 and between these conical rings and the flange 116 and the flange 120 on the brake-operating spider 121 are the friction bands 122 which restrain the movement of the rings 119 and the gear ring 63 when the spider 12 is pressed outwardly.

The details of construction and the proportions and sizes of the parts may all be changed by those skilled in the automobile art without departing from the spirit of my invention as set forth in the following claims.

I claim:—

1. In a motor vehicle, the combination of an axle and a tubular casing surrounding the same, a wheel comprising two outwardly convex sides and a circumferential connecting member between them, gears mounted between said sides and operatively connecting the axle and one of said sides, a brake carrier extending into said wheel, brake devices within the wheel mounted in engagement with the brake carrier, and means coaxial with the axle for controlling the brake.

2. In a motor vehicle, the combination of an axle, a brake actuating tube surrounding the axle and an axle casing surrounding said tube, a tractor wheel comprising separated sides connected at their peripheries, one of said sides provided within the wheel with a brake member, a stationary brake member mounted on the end of said axle casing and extending into said wheel, friction means coöperating with said brake members and and operatively connected to the brake actuating tube, an idler wheel mounted on the stationary brake member, an internal gear mounted within said wheel and connected thereto and meshing with said idler, and a gear on said axle meshing with the idler.

3. In a motor vehicle, the combination of a tractor wheel comprising two separated sides connected at their peripheries and provided with independent hubs, a shaft extending into said wheel, gears within the wheel operatively connecting it to the shaft, a brake mechanism within the wheel, means extending co-axially of the shaft to operate the brake, a bearing for each hub of the wheel, and a casing surrounding the shaft and supporting said bearings.

4. In a motor vehicle, the combination of a tractor wheel comprising two separated sides connected at their peripheries and provided with independent hubs, a shaft extending into said wheel, gears within the wheel operatively connecting it to the shaft, a brake mechanism within the wheel, means extending co-axially of the shaft to operate the brake, a bearing for each hub of the wheel, and a casing surrounding the shaft and supporting said bearings and means mounted on one of the hubs and surrounding the casing to prevent the entrance of dust.

5. In a motor vehicle, the combination of an axle, an axle casing surrounding the axle, a supporting member mounted on the end of the casing and bearings on the inner and outer ends of the support, a hollow wheel mounted on said bearings, means intermediate said bearings connecting the wheel to the axle, a brake actuator mounted coaxial to the shaft within the casing, a brake mechanism mounted within the wheel, and means within the wheel connecting the brake actuator to the brake mechanism.

6. In a motor vehicle the combination of an oil tight hollow wheel, an axle casing and a bearing thereon upon which said wheel is mounted, means between the wheel and casing to prevent leakage between them, a shaft extending through the casing into said wheel, and gears within the wheel to operatively connect the wheel to the axle, a brake device within the wheel, and means movably mounted within the axle casing to operate said brake device.

7. In a motor vehicle, the combination of an axle and a tubular casing therefor, a wheel comprising spaced sides connecting at their peripheries, said sides having hubs and bearings therein, one of which surrounds said axle casing, a brake carrier mounted on the end of the axle casing within said wheel, an idler gear mounted on said carrier, gears meshing with the idler secured to the axle and to one of the sides of said wheel, a brake mechanism mounted on said carrier, and means extending longitudinally of said axle and the axle casing and inside the said bearing surrounding the casing to operate said brake mechanism.

8. In a motor vehicle, the combination of an axle and a tubular casing therefor, a wheel comprising spaced sides connecting at their peripheries and hubs formed on said sides, a supporting member attached to said casing and bearings mounted thereon for said hubs, a ring connected to one of said sides and having internal and external teeth, a pinion on the axle, an idler gear meshing with the pinion and the internal teeth, a shaft for said idler mounted on said supporting member, a series of brake rings engaging the supporting member and the external teeth on said ring, a longitudinally movable brake operating member mounted within the tubular casing, and means extending therefrom to operate said brake rings.

9. In a motor vehicle, the combination of an axle and a tubular casing surrounding the same, a wheel at the outer end of the casing, gears connecting the wheel and axle, a brake mechanism within the wheel, and means coaxial with the axle for controlling the brake mechanism.

10. In a motor vehicle, the combination of a wheel comprising two sides and a circumferential connecting member between them, a stationary brake carrier within the wheel, an internally toothed ring mounted within the wheel, an idler gear mounted on the brake carrier and meshing with said internally toothed ring, a pinion secured to the axle in mesh with said idler gear, a brake mechanism mounted between the brake carrier and said ring, and means to control the brake mechanism.

11. In a motor vehicle, the combination of a wheel comprising two sides and a circumferential connecting member between them constituting an oil receptacle, a stationary brake carrier within the wheel and comprising a cylindrical ring having internal teeth, an internally and externally toothed cylindrical ring attached to said wheel within the first named ring, an idler gear mounted on the brake carrier and meshing with the internal teeth of said second named ring, a pinion secured to said axle in mesh with said idler gear, and a disk-brake mechanism mounted in said oil receptacle between said toothed rings and engaged thereby.

12. In a motor vehicle, the combination of a casing, a wheel mounted on the casing and comprising two sides and a circumferential connecting member between them constituting an oil receptacle, means at the inner edge of the inner side of the wheel to form a rubbing joint with said casing, a brake support of larger diameter than said rubbing joint mounted on the casing within the wheel, a brake ring connected to the wheel between its sides, a brake mechanism mounted between the brake carrier and said ring, and means to control the brake mechanism; said brake ring being formed with internal teeth, a short shaft mounted on said brake carrier, an idler gear mounted on the short shaft in mesh with said internal teeth, a pinion secured to said axle and meshing with said idler gear, and a bearing for the end of said axle outside of said pinion, and a support for said bearing mounted on said brake carrier.

CLARK W. PARKER.